US009158824B2

(12) United States Patent
Hirzel

(10) Patent No.: US 9,158,824 B2
(45) Date of Patent: Oct. 13, 2015

(54) INCREMENTAL AGGREGATION-BASED EVENT PATTERN MATCHING

(71) Applicant: International Business Machines Corporation, Armonk, NY (US)

(72) Inventor: Martin J. Hirzel, Ossining, NY (US)

(73) Assignee: International Business Machines Corporation, Armonk, NY (US)

( * ) Notice: Subject to any disclaimer, the term of this patent is extended or adjusted under 35 U.S.C. 154(b) by 164 days.

(21) Appl. No.: 13/914,184

(22) Filed: Jun. 10, 2013

(65) Prior Publication Data
US 2014/0365524 A1    Dec. 11, 2014

(51) Int. Cl.
G06F 17/30    (2006.01)

(52) U.S. Cl.
CPC .................. *G06F 17/30539* (2013.01)

(58) Field of Classification Search
CPC ........................................................ G06F 17/30
See application file for complete search history.

(56) References Cited

U.S. PATENT DOCUMENTS

| 6,775,682 | B1 | 8/2004 | Ballamkonda et al. |
| 7,945,540 | B2 | 5/2011 | Park et al. |
| 8,024,287 | B2 | 9/2011 | Abouzied et al. |
| 2010/0057737 | A1* | 3/2010 | Srinivasan et al. ................ 707/6 |
| 2011/0040734 | A1 | 2/2011 | Andrade et al. |
| 2011/0113031 | A1 | 5/2011 | Oliver et al. |
| 2011/0137719 | A1 | 6/2011 | Song et al. |
| 2012/0016901 | A1 | 1/2012 | Agarwal et al. |
| 2012/0130940 | A1* | 5/2012 | Gattani et al. ................. 707/600 |
| 2014/0040915 | A1* | 2/2014 | Chen et al. ..................... 718/107 |

OTHER PUBLICATIONS

Hirzel, "Partition and compose: Parallel complex event processing," Jul. 2012, pp. 191-200, Proceedings of the 6th ACM International Conference on Distributed Event-Based Systems, Berlin, DOI: 10.1145/2335484.2335506.
Dragut, "Stock Data Clustering and Multiscale Trend Detection," Jul. 2010, pp. 87-105, Methodology and Computing in Applied Probability, v14, n1, Netherlands, DOI: 10.1007/s11009-010-9186-7.
Woods et al., "Complex Event Detection at Wire Speed with FPGAs," Sep. 2010, 10 pages, Proceedings of the VLBD Endowment, V3, No. 1, Singapore.

* cited by examiner

*Primary Examiner* — Khanh Pham
(74) *Attorney, Agent, or Firm* — William Stock; Hoffam Warnick LLC

(57) ABSTRACT

Aspects of the present invention provide a solution for recognizing a pattern in a set of data, such as data streaming over a data communication system. In an embodiment, a set of data events is retrieved in the data stream. The retrieved objects each have a plurality of characteristics that can be matched to a predetermined desired characteristic, such as a key value. The retrieved data events can be evaluated with respect to a pattern, with a characteristic of data events being evaluated with respect to an aggregate value related to the pattern. This aggregate value can be updated incrementally based on the data in the characteristic. Based on the evaluation, a determination as to whether the set of data events received subsequent to the first object satisfies the pattern.

19 Claims, 12 Drawing Sheets

INCREMENTAL AGGREGATION-BASED EVENT PATTERN MATCHING

TECHNICAL FIELD

The subject matter of this invention relates generally to pattern recognition. More specifically, aspects of the present invention provide a solution for recognizing a pattern in a data stream having a large number of streaming events.

BACKGROUND

As information technology has developed, the amount of incoming data has increased dramatically. Data communication systems have developed from simple solutions that linked a single user to one other user to vast communication networks that communicate large amounts of data among a large number of users. These data communication systems often continue to grow over time, with new and/or faster communications structures being added constantly.

This evolution of data communication systems has precipitated a parallel development in the logic used to interpret the data communicated thereon. One such strategy involves attempting to discern a pattern in the data that is being communicated. Such patterns can help to provide meaning to the large volume of communications that might otherwise be difficult.

SUMMARY

In general, aspects of the present invention provide a solution for recognizing a pattern in a set of data, such as data streaming over a data communication system. In an embodiment, a set of data events is retrieved in the data stream. The retrieved objects each have a plurality of characteristics that can be matched to a predetermined desired characteristic, such as a key value. The retrieved data events can be evaluated with respect to a pattern, with a characteristic of subsequent data events being evaluated with respect to an aggregate value related to the pattern. This aggregate value can be updated incrementally based on the data in the characteristic. Based on the evaluation, a determination as to whether the set of data events received subsequent to the first object satisfies the pattern.

A first aspect of the invention provides a method for recognizing a pattern, comprising: retrieving a set of data events in a data stream, each data event in the data stream having a plurality of characteristics; evaluating a characteristic of each data event, which has a characteristic that matches a predetermined requested characteristic, in the set of data events with respect to an aggregate value corresponding to the desired pattern; incrementally updating the aggregate value related to the characteristic using the characteristic of a single data event; and determining, based on the evaluation, whether the set of data events received subsequent to the first data event satisfies the desired pattern.

A second aspect of the invention provides a system for recognizing a pattern, comprising at least one computer device that performs a method, comprising: retrieving a set of data events in a data stream, each data event in the data stream having a plurality of characteristics; evaluating a characteristic of each data event, which has a characteristic that matches a predetermined requested characteristic, in the set of data events with respect to an aggregate value corresponding to the desired pattern; incrementally updating the aggregate value related to the characteristic using the characteristic of a single data event; and determining, based on the evaluation, whether the set of data events received subsequent to the first data event satisfies the desired pattern.

A third aspect of the invention provides a computer readable storage medium having a program product stored thereon for recognizing a pattern, which, when executed by a computer device, performs a method, comprising: retrieving a set of data events in a data stream, each data event in the data stream having a plurality of characteristics; evaluating a characteristic of each data event, which has a characteristic that matches a predetermined requested characteristic, in the set of data events with respect to an aggregate value corresponding to the desired pattern; incrementally updating the aggregate value related to the characteristic using the characteristic of a single data event; and determining, based on the evaluation, whether the set of data events received subsequent to the first data event satisfies the desired pattern.

A fourth aspect of the invention provides a method for deploying an application for recognizing a pattern, comprising: providing a computer infrastructure being configured to: retrieve a set of data events in a data stream, each data event in the data stream having a plurality of characteristics; evaluate a characteristic of each data event, which has a characteristic that matches a predetermined requested characteristic, in the set of data events with respect to an aggregate value corresponding to the desired pattern; incrementally update the aggregate value related to the characteristic using the characteristic of a single data event; and determine, based on the evaluation, whether the set of data events received subsequent to the first data event satisfies the desired pattern.

BRIEF DESCRIPTION OF THE DRAWINGS

These and other features of this invention will be more readily understood from the following detailed description of the various aspects of the invention taken in conjunction with the accompanying drawings in which.

Figure 1:
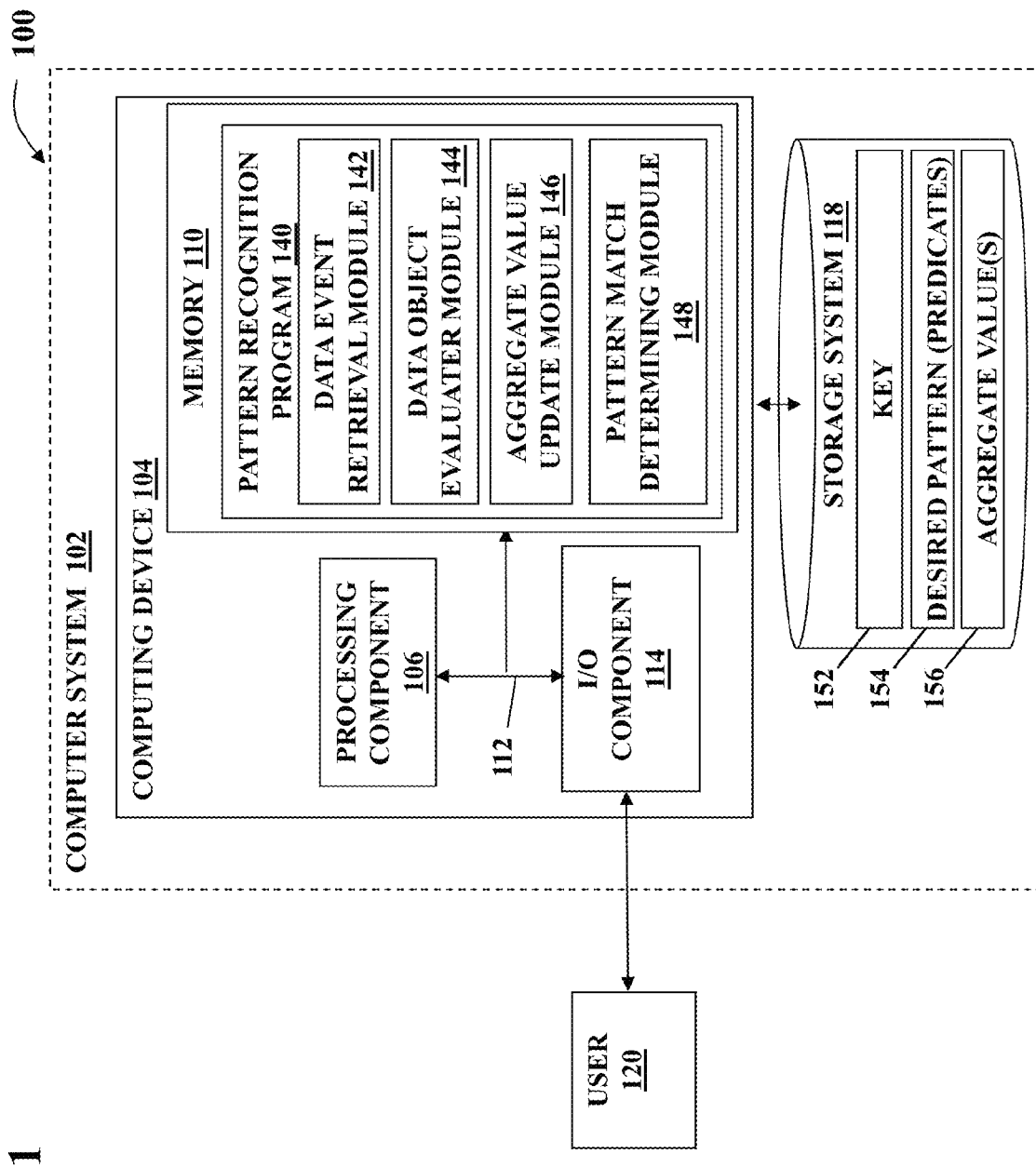
FIG. 1 shows an illustrative computer system according to embodiments of the present invention.

The drawings are not necessarily to scale. The drawings are merely schematic representations, not intended to portray specific parameters of the invention. The drawings are intended to depict only typical embodiments of the invention, and therefore should not be considered as limiting the scope of the invention. In the drawings, like numbering represents like elements.

DETAILED DESCRIPTION

The inventors of the present invention have discovered that pattern matching strategies suffer from certain deficiencies. For example, current strategies may attempt to store every data event or a large number of data events and attempt to discern a pattern based on all of the stored values. However, this strategy can require a large amount of storage space in cases in which detection of the pattern requires processing of a large number of data events and/or the amount of data in each particular data event is large. Further, if a user wants further information computed when this strategy finds a pattern match, the calculations required to provide this information require all or a substantial number of the data events to be used, taking time and expending resources. In addition, current strategies may attempt to provide this pattern-matching ability using a single machine and/or processing module to match many differing patterns and/or over data events having many different characteristics. However, systems using these strategies can suffer from inefficiencies as a machine and/or module that is optimized to process information for one particular pattern may be less efficient in processing information regarding another pattern. Further, attempting to perform many or all of retrieval, selection and evaluation of all of the data in one place could cause the machine and/or module to become overwhelmed due to the large amount of data.

As indicated above, aspects of the present invention provide a solution for recognizing a pattern in a set of data, such as data streaming over a data communication system. In an embodiment, a set of data events is retrieved in the data stream. The retrieved objects each have a plurality of characteristics that can be matched to a predetermined desired characteristic, such as a key value. The retrieved data events can be evaluated with respect to a pattern, with a characteristic of subsequent data events being evaluated with respect to an aggregate value related to the pattern. This aggregate value can be updated incrementally based on the data in the characteristic. Based on the evaluation, a determination as to whether the set of data events received subsequent to the first object satisfies the pattern.

Turning to the drawings, FIG. 1 shows an illustrative environment 100 for recognizing a pattern. To this extent, environment 100 includes a computer system 102 that can perform a process described herein in order to recognize a pattern. In particular, computer system 102 is shown including a computing device 104 that includes a pattern recognition program 140, which makes computing device 104 operable to recognize a pattern by performing a process described herein.

Computing device 104 is shown including a processing component 106 (e.g., one or more processors), a memory 110, a storage system 118 (e.g., a storage hierarchy), an input/output (I/O) component 114 (e.g., one or more I/O interfaces and/or devices), and a communications pathway 112. In general, processing component 106 executes program code, such as pattern recognition program 140, which is at least partially fixed in memory 110. To this extent, processing component 106 may comprise a single processing unit, or be distributed across one or more processing units in one or more locations.

Memory 110 also can include local memory, employed during actual execution of the program code, bulk storage (storage 118), and/or cache memories (not shown) which provide temporary storage of at least some program code in order to reduce the number of times code must be retrieved from bulk storage 118 during execution. As such, memory 110 may comprise any known type of temporary or permanent data storage media, including magnetic media, optical media, random access memory (RAM), read-only memory (ROM), a data cache, a data event, etc. Moreover, similar to processing component 116, memory 110 may reside at a single physical location, comprising one or more types of data storage, or be distributed across a plurality of physical systems in various forms.

While executing program code, processing component 106 can process data, which can result in reading and/or writing transformed data from/to memory 110 and/or I/O component 114 for further processing. Pathway 112 provides a direct or indirect communications link between each of the components in computer system 102. I/O component 114 can comprise one or more human I/O devices, which enable a human user 120 to interact with computer system 102 and/or one or more communications devices to enable a system user 120 to communicate with computer system 102 using any type of communications link.

To this extent, pattern recognition program 140 can manage a set of interfaces (e.g., graphical user interface(s), application program interface, and/or the like) that enable human and/or system users 120 to interact with pattern recognition program 140. Users 120 could include system administrators and/or clients who need to store and/or recognize a pattern in a storage system environment, among others. Further, pattern recognition program 140 can manage (e.g., store, retrieve, create, manipulate, organize, present, etc.) the data in storage system 118, including, but not limited to a key 152, a desired pattern 154 (e.g., including one or more predicates), and/or an aggregate value 156, using any solution.

In any event, computer system 102 can comprise one or more computing devices 104 (e.g., general purpose computing articles of manufacture) capable of executing program code, such as pattern recognition program 140, installed thereon. As used herein, it is understood that "program code" means any collection of instructions, in any language, code or notation, that cause a computing device having an information processing capability to perform a particular action either directly or after any combination of the following: (a) conversion to another language, code or notation; (b) reproduction in a different material form; and/or (c) decompression. To this extent, pattern recognition program 140 can be embodied as any combination of system software and/or application software. In any event, the technical effect of computer system 102 is to provide processing instructions to computing device 104 in order to recognize a pattern.

Further, pattern recognition program 140 can be implemented using a set of modules 142-148. In this case, a module 142-148 can enable computer system 102 to perform a set of tasks used by pattern recognition program 140, and can be separately developed and/or implemented apart from other portions of pattern recognition program 140. As used herein, the term "component" means any configuration of hardware, with or without software, which implements the functionality described in conjunction therewith using any solution, while the term "module" means program code that enables a computer system 102 to implement the actions described in conjunction therewith using any solution. When fixed in a memory 110 of a computer system 102 that includes a processing component 106, a module is a substantial portion of a component that implements the actions. Regardless, it is understood that two or more components, modules, and/or systems may share some/all of their respective hardware and/or software. Further, it is understood that some of the functionality discussed herein may not be implemented or additional functionality may be included as part of computer system 102.

When computer system 102 comprises multiple computing devices 104, each computing device 104 can have only a portion of pattern recognition program 140 fixed thereon (e.g., one or more modules 142-148). However, it is understood that computer system 102 and pattern recognition program 140 are only representative of various possible equivalent computer systems that may perform a process described herein. To this extent, in other embodiments, the functionality provided by computer system 102 and pattern recognition program 140 can be at least partially implemented by one or more computing devices that include any combination of general and/or specific purpose hardware with or without program code. In each embodiment, the hardware and program code, if included, can be created using standard engineering and programming techniques, respectively.

Regardless, when computer system 102 includes multiple computing devices 104, the computing devices can communicate over any type of communications link. Further, while performing a process described herein, computer system 102 can communicate with one or more other computer systems using any type of communications link. In either case, the communications link can comprise any combination of various types of wired and/or wireless links; comprise any combination of one or more types of networks; and/or utilize any combination of various types of transmission techniques and protocols.

As discussed herein, pattern recognition program 140 enables computer system 102 to recognize a pattern. To this extent, pattern recognition program 140 is shown including a data event retrieval module 142, a data event analyzer module 144, an aggregate value update module 146, and a pattern match determining module 148.

Figure 2:
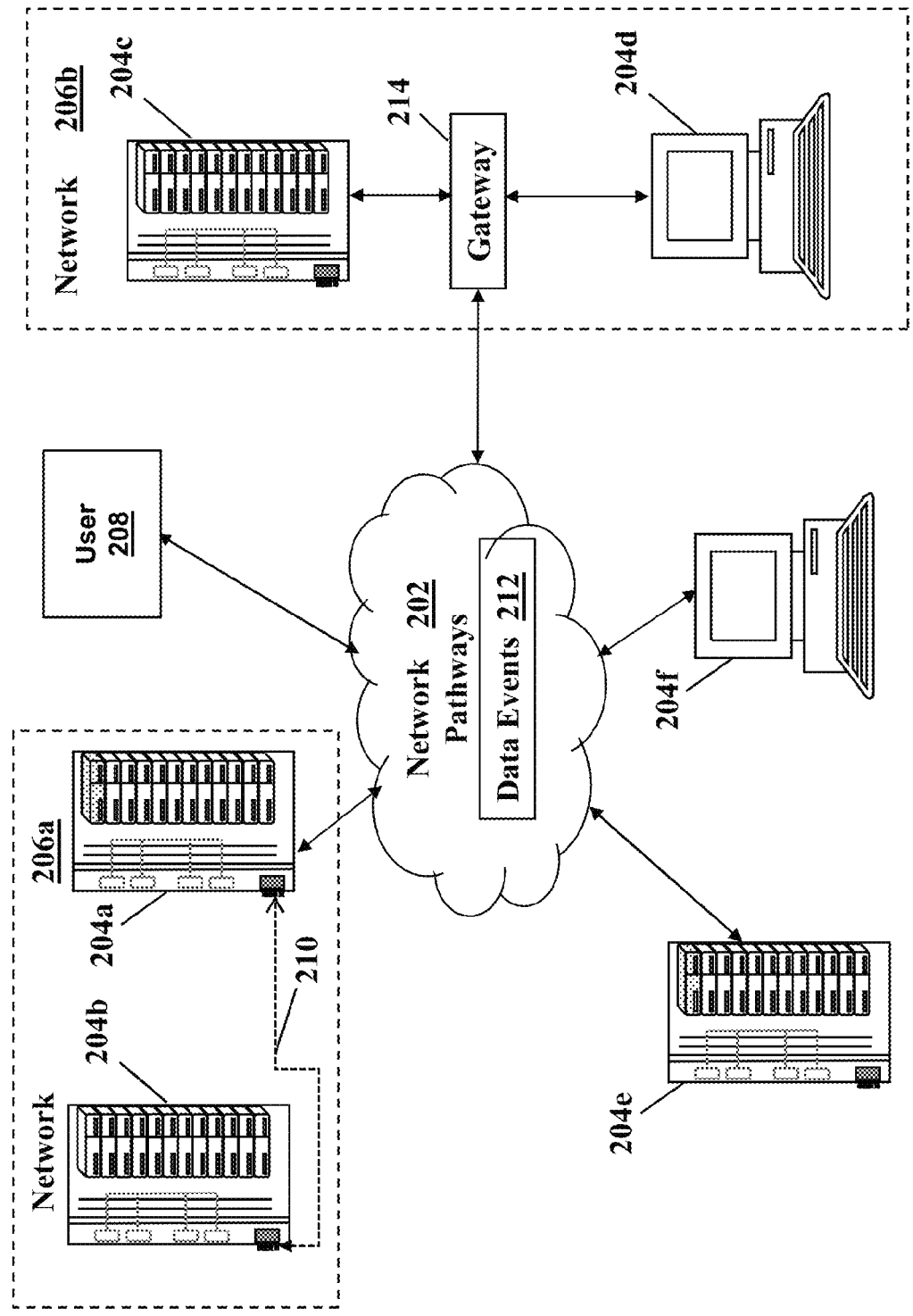
FIG. 2 shows a geographically distributed network according to embodiments of the invention.

Turning now to FIG. 2, a geographically distributed network 200 according to embodiments of the invention is shown. As shown, geographically distributed network 200 includes a number of data sources 204a-f. One or more of data sources 204a-f can be included in an internal network 206a-b, such as data sources 204a-d. Such a network can include a frontend system 204a which access a backend system 204b via a connection 210, such as in network 206a. Alternatively, such a network can include a distributed network, such as network 206b, that has a number of systems (e.g., data sources 204c-d) which access network pathways 202 via a gateway 214. In contrast, one or more of data sources 204a-f can be stand-alone systems, such as data sources 204e, 204f. Further, one or more of data sources 204a-f can be servers (e.g., data sources 204a, 204b, 204c and 204 e) while others can be clients (e.g., data sources 204d and 204f). In any case, data sources 204a-f can provide data events 212 to and/or receive data events 212 from other data sources 204a-f via network pathways 202 using any solution. In addition, a user 208 can access data events 212 from data sources 204a-f over network pathways 202 using any solution.

Figure 3:
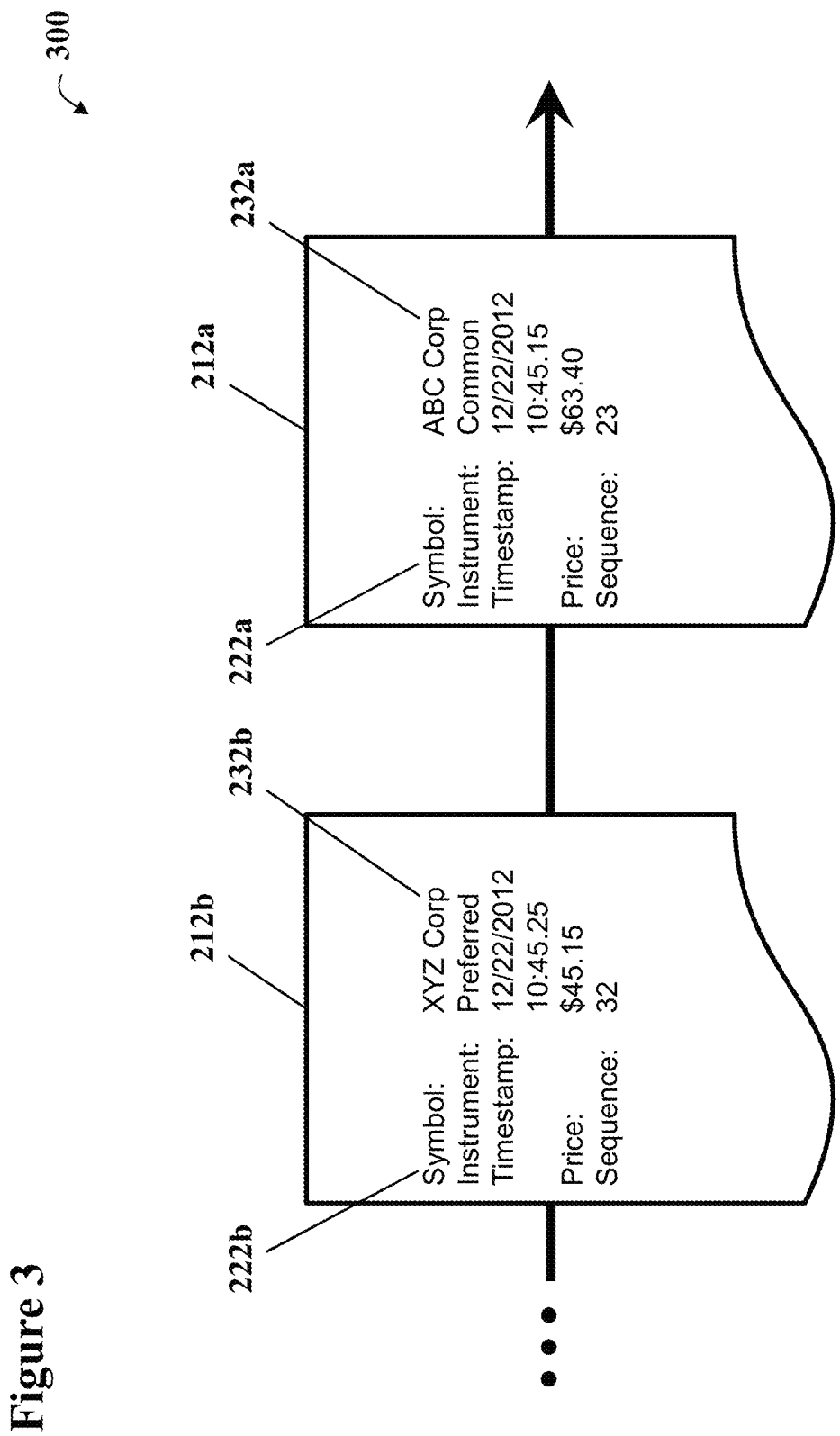
FIG. 3 shows an example data stream according to embodiments of the invention.

Turning now to FIG. 3 in conjunction with FIGS. 1 and 2, an example data stream 300 according to an embodiment is shown. Computer system 102, executing data event retrieval module 142, can retrieve a set of data events (e.g., data events 212a, 212b) in data stream 300. Data stream 300 should be understood to include a large amount of traffic over network pathways 202. This traffic could include any data events 212 communicated from data sources 204a-f, such as any data events 212 received by user 208. As illustrated in FIG. 3, data stream 300 includes a number of data events 212a, 212b, although it should be understood that data events 212a, 212b represent only a small subset of the data events 212 in data stream 300. In any event, each of the data events 212 in the data stream 300 can have a plurality of characteristics 222a, 222b. As shown, both data event 212a and data event 212b are stock quotations, although data events of any type are envisioned. To this extent, the example data events 212a, 212b in FIG. 3 contain data values 232a, 232b corresponding to the following characteristics 222a, 222b: Entity, Instrument, Date, Time, and Value.

Referring now to FIG. 1 in conjunction with FIG. 3, computer system 102, executing data event retrieval module 142, retrieves a set of data events (e.g., data events 212a, 212b) in a data stream 300. For example, as the data events 212a, 212b in data stream 300 are received, such as in real time, an entirety of the data events 212a, 212b can be retrieved or, in the alternative, one or more of these data events 212a, 212b can be retrieved from among the entirety.

Figure 4A:
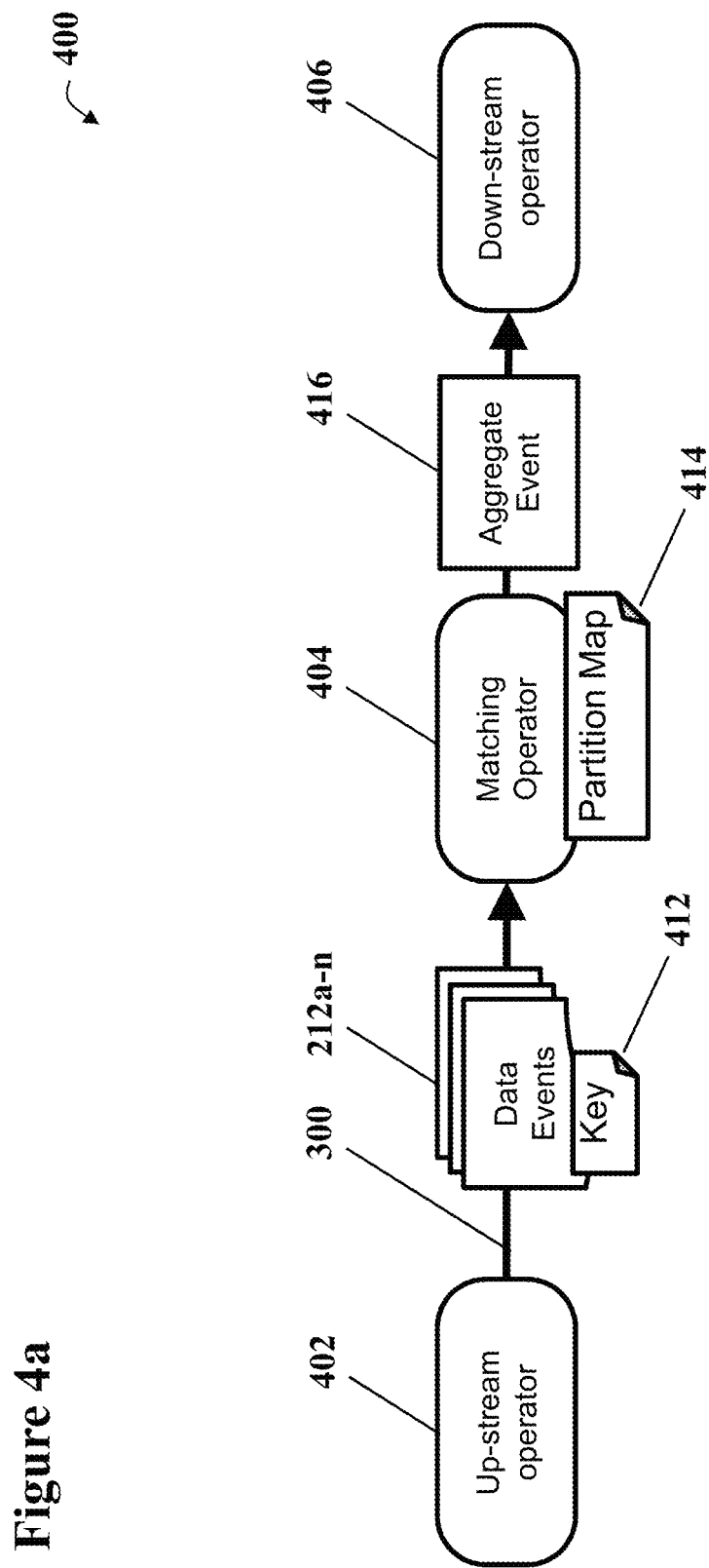
FIGS. 4a-b show example data flows according to embodiments of the invention.
Figure 4B:
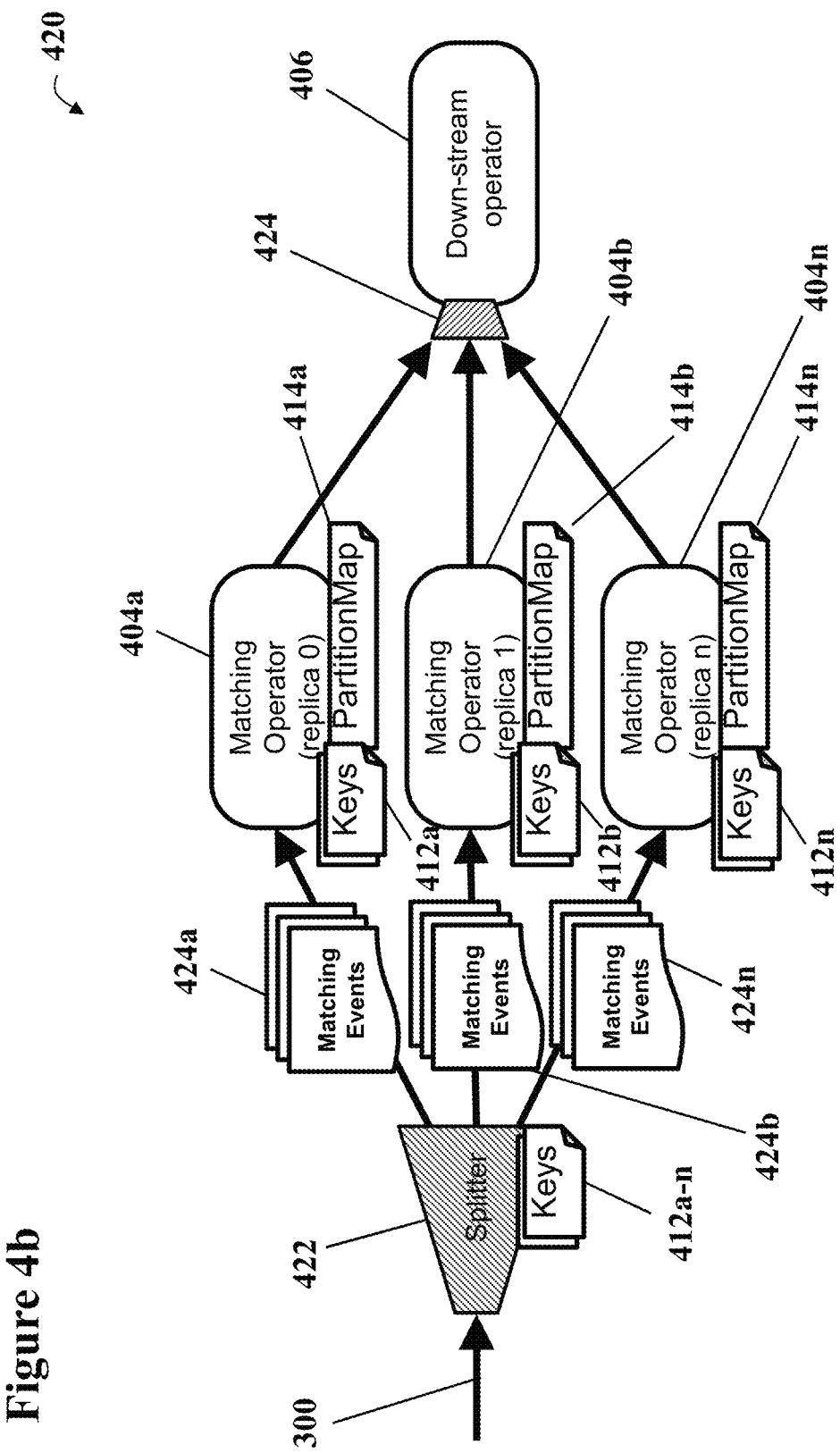

Turning now to FIGS. 4a and 4b, various example data flows 400, 420 according to embodiments of the invention are shown. Each of the example data flows 400, 420 shows data stream 300 having a number of data events 212. In embodiments of the invention, data events 212 can be received by an upstream operator 402. To this extent, in embodiments of the invention, upstream operator 402 can include a special purpose data processing component, such as a listening device, that is specifically configured to process a large amount of streaming data, such as in real time. In these embodiments, upstream operator 402 can be located at a network gateway, network node, network transition point, and/or any other place in a network that network traffic would be expected to flow through. Additionally or in the alternative, upstream operator 402 could include an active data acquisition portion (e.g., a crawler, worm and/or the like) that searches data sources (e.g., a database, web page, etc.) for data events 212. In any event, upstream operator 402 can then forward the data events 212 for further processing, such as via data stream 300.

In any event, referring now to FIGS. 3 and 4a-b, upstream operator 402 can compare the data values 232a, 232b corresponding to characteristics 222a, 222b in data events 212 with a key 412 that corresponds to the predetermined requested characteristic. If a determination is made that a characteristic 222a, 222b in a data event 212 matches a key 412, the matching event 412 can be forwarded to a matching operator 404. In contrast, any data events 212 that do not match a key 412 can be discarded. For example, suppose user 208 desired to determine whether a pattern existed in data events 212 having both the characteristics of "instrument: common" and "entity: ABC corp." User 208 could input a key value having these values. This key value could be provided to upstream operator 402 as a key 412. As illustrated in FIG. 3, upstream operator 402 would evaluate data event 212a according to the example key 412. In contrast, upstream operator 402 would make a determination that data event 212b does not match the example key 412 and, as such, does not contain a characteristic that matches the predetermined requested characteristic. As a result, upstream operator 402 and would forward data event 212a to matching operator 404 as a matching event while data event 212b would not be forwarded.

Whatever the case, upstream operator 402 could be designed to forward all data events 212 to a single matching operator 404 as shown in data flow 400 in FIG. 4a. Additionally or in the alternative, a plurality of matching operators 404a-n could be utilized as shown in data flow 420 of FIG. 4b. In this case, the data events 212 can be gathered from the data stream 300 provided by the upstream operator 402 using an event stream splitter. Event stream splitter can hash the data events 212 and can forward data events 212 to a set of matching operators 404a-n based on the hashing. All or a portion of event stream splitter 422 could be associated with upstream operator 402, can be associated with one or more of the matching operators 404a-n, and/or can be separate from both the upstream operator 402 and the matching operators 404a-n.

In any case, event stream splitter 422 can hash one or more characteristics 222a, 222b in data events 212, such as with a plurality of keys 412a-n, each of which corresponds to one or more predetermined requested characteristic. For example, event stream splitter 422 can compare the data values 232a, 232b corresponding to characteristics 222a, 222b in data events 212 with a key value 412a-n that corresponds to the predetermined requested characteristic. This key value 412a-n can be provided by a user, retrieved from a data source, computed based on a set of inputs and/or the like. In any case, if a determination is made that a characteristic 222a, 222b in a data event 212 matches a key 412a-n, the matching event 424a-n can be forwarded to a matching operator 404 that is designated to process data event 212 having the predetermined requested characteristic. In contrast, any data events 212 that do not match any key 412a-n can be discarded. Matching events 424a-n can be forwarded by event stream splitter 422 to different matching operators 404a-n depending on which of the keys 412a-n produced the match. For example, any data event 212 that was found by upstream operator 402 to match a particular key or set of keys (e.g., key 412a) could be forwarded (e.g., matching event 424a) to a specific matching operator (e.g., matching operator (replica 0) 404a), which only evaluates data events having the desired characteristic corresponding to a key or keys 412a that comprise a subset of the entirety of keys 412a-n. In the alternative, data events 212 found to match a different key or keys that comprise a different subset of the entirety of keys 412a-n (e.g., key 412n) by upstream operator 402 could be forwarded (e.g., matching event 424n) to a different specific matching operator (e.g., matching operator (replica n) 404a), which only evaluates data events having the desired characteristic corresponding to key 412n.

Referring back to FIG. 1 in conjunction with FIGS. 3, 4a and 4b, data object evaluator module 144, as executed by computer system 102, can evaluate one or more characteristics 222a, 222b of data event 212. In performing this evaluation, a single matching operator 404 can be used as shown in FIG. 4a. In the alternative, a single matching operator (e.g., matching operator 404a) out of a plurality of matching operators 404a-n, such as those shown in FIG. 4b, can perform the evaluations pertaining to data events 212 have characteristics 222a, 222b matching one or more particular desired patterns. In doing so, the matching operator 404, 404a-n can compare the data values 232a, 232b corresponding to characteristics 222a, 222b in data events 212 with a key 412, 412a-n that corresponds to the predetermined requested characteristic. If a determination is made that a characteristic 222a, 222b in a data event 212 matches a key 412, the matching event 412 can be designated for evaluation with respect to a particular process (e.g., an automaton) that evaluates the data event 212 with respect to a particular desired pattern. The matching operator 404, 404a-n can evaluate characteristics 222a, 222b of data events 212, 212a-n with respect to a set of predicates that define a relationship between data events 212, 212a-n according to the desired pattern. This evaluation can be used to select a first data event corresponding to the desired pattern from among a set of data events and/or to evaluate characteristics of subsequent data events received in the set of data events with respect an aggregate value corresponding to the desired pattern, among other things.

For example, suppose user 208 desired to determine whether a pattern existed in data events 212 having both the characteristics of "instrument: common" and "entity: ABC corp." User 208 could input a key value having these values. In the case that the multiple matching operators 412a-n of FIG. 4b are utilized, this key value could be provided to the splitter 442 as a key (e.g., key 412a) and used to forward the data event 212 to a corresponding matching operator (e.g., matching operator 404a). Similarly, a second data event 212 could be forwarded to a different matching operator (e.g., matching operator 404n) based on its matching a different key (e.g., key 412n) based on a different inputted key value. Conversely, in the case of the single matching operator 404 of FIG. 4a, all data events 212a-n can be forwarded to the same matching operator 404. Whatever the case, the matching operator 404 to which the data event 212a-n has been forwarded or the matching operator 404a-n to which the matching event 424a-n would the evaluate data event 212 or matching event 424a-n according to the example key 412, 412a-n. For example, the matching operator 404, 404a-n to which the data event 212a-n or matching event 424a-n has been forwarded could the begin or continue evaluating the data events 212 having both the characteristics of "instrument: common" and "entity: ABC corp" using a process/automaton that searches for a particular pattern (e.g., an M-type pattern).

Figure 5:
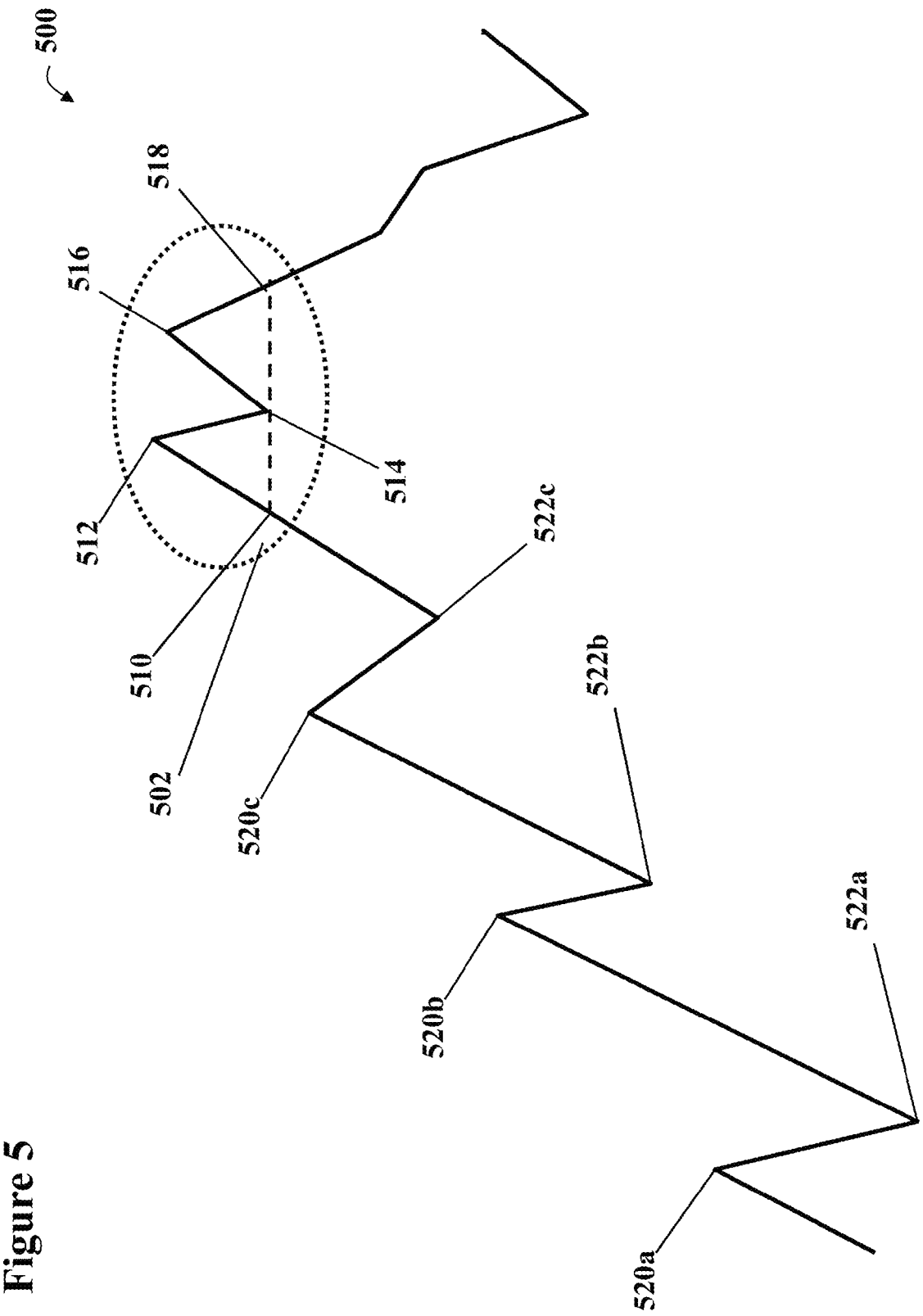
FIG. 5 shows a graph having an example desired pattern according to embodiments of the invention.

Turning now to FIG. 5, a graph 500 having an example desired pattern 502 according to embodiments of the invention is shown. As illustrated, desired pattern 402 is an "m-shaped" pattern. To this extent, in this case, the characteristic in desired pattern 402 that is being monitored must increase from a starting point 510 to a first peak 512. Then the monitored characteristic must decrease from the first peak 512 to a first valley 514 and increase again to a second peak 516. Finally, the monitored characteristic must decrease to a final point 518 that is below the first valley 514. Note that the plot illustrated by graph 500 includes other peaks 520a-c and valleys 522a-c. However, only the peaks 512, 516 and valley 514 within between the starting point 510 and the final point 518 satisfy the requirements of the desired pattern 502.

Figure 6:
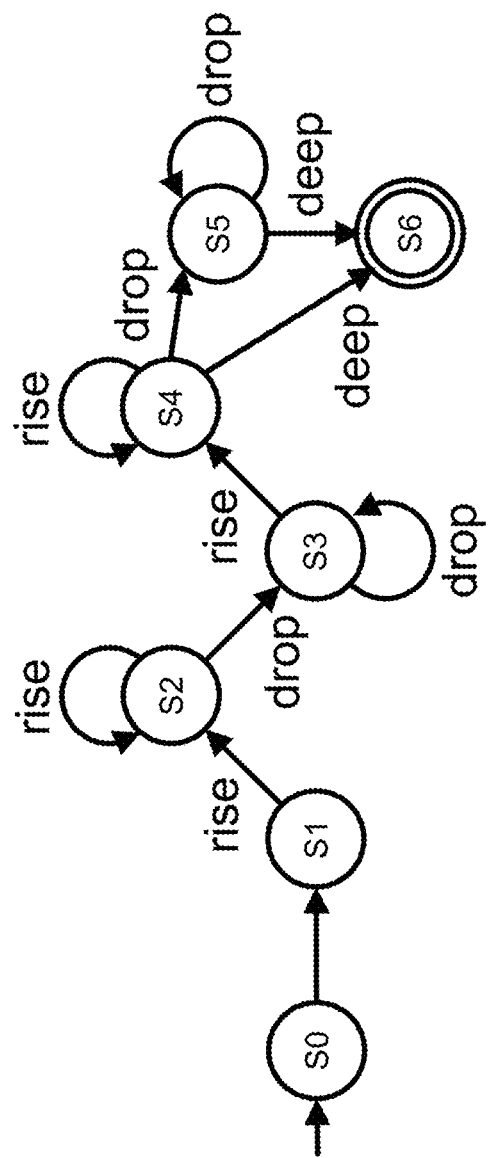
FIG. 6 shows an example automaton according to embodiments of the invention.

Turning now to FIG. 6, an automaton 600 according to embodiments of the invention is shown. As illustrated, automaton 600 corresponds to the desired pattern 502 shown in FIG. 5. Automaton 600 can have a number of transitions or predicates (indicated in the FIG. 6 with labeled arrows), which can be labeled with predicate names. In addition, automaton 600 can include a group of states S1-S6 that can occur in achieving desired pattern 502. For example, state S0 indicates the start of a new search for desired pattern 502 at which point the state moves to state S1. The state remains at state S1 until a predicate rise in the value of the monitored characteristic occurs, at which point the state moves to S2 for each subsequent predicate rise until a predicate fall is detected. At this point the state moves to S3 for each subsequent predicate fall until another predicate rise is detected, at which point the state moves to S4. At this point the state moves to S5 and stays at state S5 for any predicate drop that is not a predicate deep drop (e.g., a predicate drop that is below the predicate drop at valley 514) and/or moves to state S6 when a predicate drop occurs that is a predicate deep drop.

In any case, turning again to FIGS. 5 and 6, in conjunction with FIG. 3, data values 232a corresponding to one or more characteristics in 222a of each matching data event 212a can be evaluated in conjunction with automaton 600. In performing this evaluation, each data value 232a in the matching data event 212a can be evaluated with respect to one or more aggregate values that correspond to the desired pattern 502 as represented by automaton 600. For example, suppose the characteristic 222a corresponding to "value", which in this case has a data value 232a of "$63.40" was being evaluated with respect to desired pattern 502. Further, suppose that automaton 600 is currently in state S2 and that an aggregate value of the monitored characteristic is $63.00. Then, given that the data value 232a, is greater than the aggregate value used to track the peak, it can be deduced that the aggregate value is not that of first peak 512 and the automaton 600 should remain at state S3. In contrast, if the aggregate value of the monitored characteristic has a current value of $64.00, if can be deduced that the aggregate value reflects a peak value and a downward trend has begun. The state would then move from state S3 to state S4.

Turning again to FIG. 1, aggregate value update module 146, as executed by computer system 102, incrementally updates one or more aggregate values related to the monitored characteristic. Referring additionally to FIGS. 3, 4a and 4b, this incremental updating can occur based on the receipt of a single data event 412. For example, matching operator 404 could access a partition map 414 containing the aggregate value or values. For each data event 412 received by matching operator 404, matching operator 404 can evaluate the characteristic(s) 222a in the matching event 212a based on the aggregate value(s) in the partition map 414 and/or incrementally update the aggregate value(s) in the partition map 414 based on the single matching event 212a, including the characteristic(s) 222a included therein.

Figure 7A:
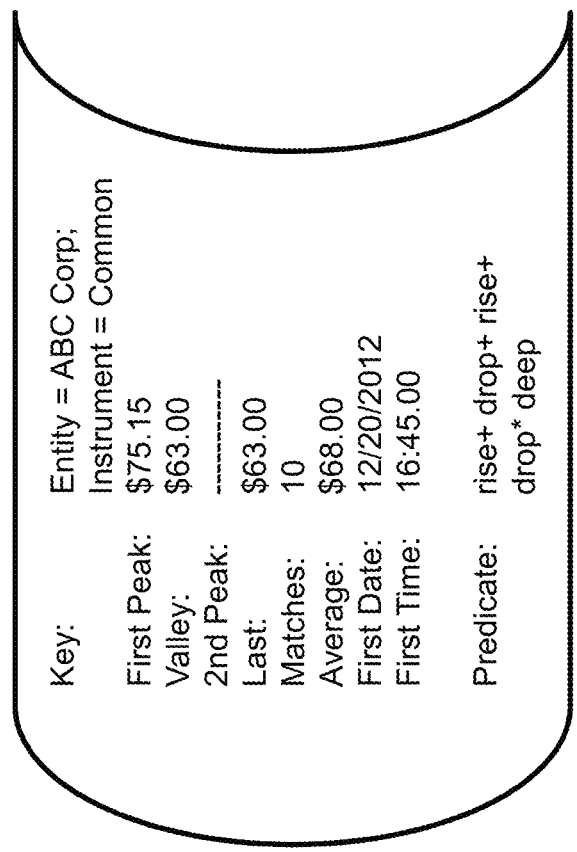
FIG. 7a-c show example partition map entries according to embodiments of the invention.

Referring now to FIG. 7a, an example partition map entry 700 according to embodiments of the invention is shown. As illustrated and described with the inclusion of FIGS. 3, 4a and 4b and 6, partition map entry 700 can include a key 412 used by upstream operator 402 and/or event stream splitter 422 to forward data events 212 to matching operator 404, as discussed elsewhere. Partition map 700 can also include a predicate (e.g., one or more predicates and/or states) that corresponds to the automaton 600 (FIG. 6) of the desired pattern 502 (FIG. 5). This predicate can be a representation of the desired pattern 502 (FIG. 5) and can be represented in any form now known or later developed, including but not limited to equation, expression, code, pseudo-code, and/or the like. In an embodiment all or a portion of the predicate can be represented in the form of a regular expression as shown in FIG. 5. As known in the art, a regular expression can include a specific pattern that provides an ability to match strings of text, including, but not limited to characters, character patterns, words, and/or the like. For example, the predicate based on "price" for desired pattern 502 could be represented by the regular expression: rise+drop+rise+drop*deep.

In any event, partition map entry 700 can also include a number of aggregate values. As shown, one or more aggregate values (e.g., first peak, valley, second peak, last, average) in partition map entry 700 can correspond to the characteristic being monitored (e.g., price) to satisfy the predicate. Additionally or in the alternative, one or more aggregate values in partition map entry 700 can correspond to non-monitored characteristics (e.g., date/time) and/or can represent values (e.g., a counter of data events 212) that do not directly correspond to characteristics in the data events 212.

For example, as shown, partition map entry 700 has an aggregate value for first peak of $75.15 and an aggregate value for valley $63.00 indicating that the state of automaton 600 has passed states S0, S1 and S2 and is at state S3 or further. Further, the aggregate value for 2nd peak is NULL, indicating that the state has not yet reached state S4. This is also reinforced by the fact that the aggregate value for last is $63.00 which is identical to the aggregate value for valley, indicating that aggregate value for valley was incrementally updated using characteristic data from the most recent matching event 412.

Figure 7B:
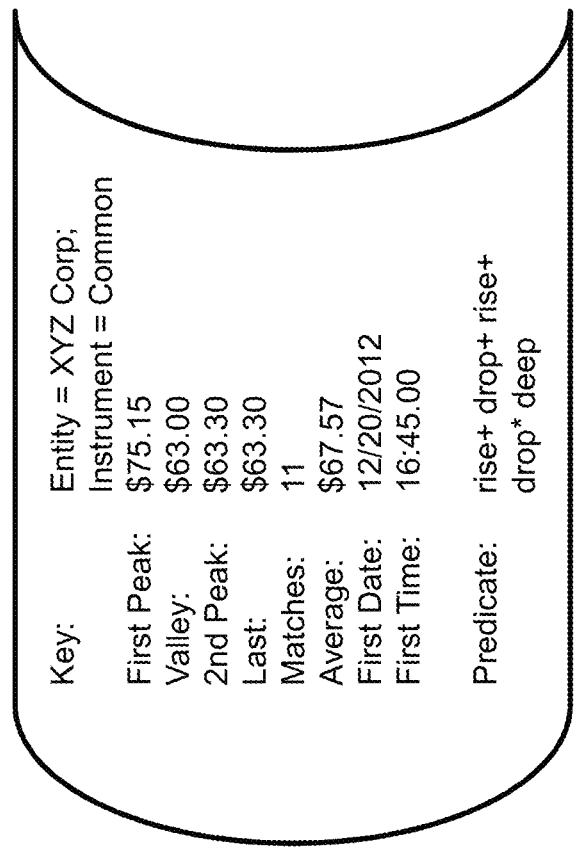

Referring now to FIG. 7b, a subsequent example partition map entry 720 according to embodiments of the invention is shown. Discussing FIG. 7b in conjunction with FIGS. 3 and 7a, partition map entry 720 represents partition map entry 700 subsequent to receipt and evaluating of a matching event 424 (FIG. 4a), which in this case is matching event 212a. As can be seen, some of the aggregate values in partition map entry 720 have remained the same between the prior partition map entry 720 and partition map entry 700. For example, the key and predicate fields have not changed. Similarly, because the state of automaton 600 has passed state S2, and has not been reset back to state S0, the aggregate value corresponding to first peak 512 (FIG. 5) remains the same. Also notice that the aggregate value corresponding to valley 514 (FIG. 5) has not changed. However, in contrast to the aggregate value corresponding to first peak 512 (FIG. 5), the lack of change in the aggregate value corresponding to valley 514 (FIG. 5) is due to the change in state of automaton 600 from state S3 to state S4. Specifically, the fact that the "value" characteristic 222a of matching event 212a has a data value 232a of $63.30, which is greater than the aggregate value corresponding to "last" of $63.00 in the prior partition map entry 700 indicates that the predicate drop in value that characterizes state S3 has ended and a predicate rise in value attributed to state S4 has begun. To this extent, the value of $63.00, which was the "valley" aggregate value in the prior partition map entry 700 remains the "valley" aggregate value in the new partition map entry 720.

In contrast, other aggregate values in the new partition map entry 720 are incrementally updated based solely on the data value(s) 232a corresponding to the characteristic(s) 222a in matching event 212a. The "last" aggregate value has changed to $63.30 and the "last" value of $63.00 from the previous partition map entry 700 has been discarded. This new "last" aggregate value can subsequently be used to provide a comparison for with the data value 232a corresponding to the "value" characteristic 222a in the next subsequent data event 412 (FIG. 4) forwarded from upstream operator 402 to matching operator 404. Further, the "2nd peak" aggregate value has changed from NULL to the present "value" data value 232a of $63.30, indicating that this value is the value against which a subsequent new value will be evaluated in determining whether a predicate rise is continuing under state S4 or whether a predicate drop and resulting state change has occurred. Note also that the aggregate value corresponding to "average" has changed to reflect the next "value" data value 232a of $63.30 and the "matches" aggregate value has been incremented by 1. This calculation can be made by multiplying the former "average" aggregate value by the count, adding the new value, and dividing by the new count, which is the old count plus one (e.g., new average=((average*count)+new value)/(count+1)). In this way, aggregate values representing running statistics can be maintained without the need to permanently store the underlying data values.

This use of aggregate values can allow the present invention to recognize a pattern without retaining data regarding every data event needed to satisfy the desired pattern 502 (FIG. 2). Rather, only a small subset need be retained at any one point in time, and any data that is no longer needed for recognizing the pattern can be discarded. Furthermore, any statistics that need to be collected can be incrementally aggregated as new data from each new data event 412 (FIG. 4) is received, saving time and resources once the pattern has been recognized.

Referring again to FIG. 1, pattern match determining module 148, as executed by computer system 102, can determine whether the set of data events 212 (FIG. 4) that have been evaluated by matching operator 404 (FIG. 4) satisfies the desired pattern 502 (FIG. 5). In making this determination, pattern match determining module 148 can evaluate the aggregate value(s) 156 to determine whether the predicates 154 have been satisfied.

Figure 7C:
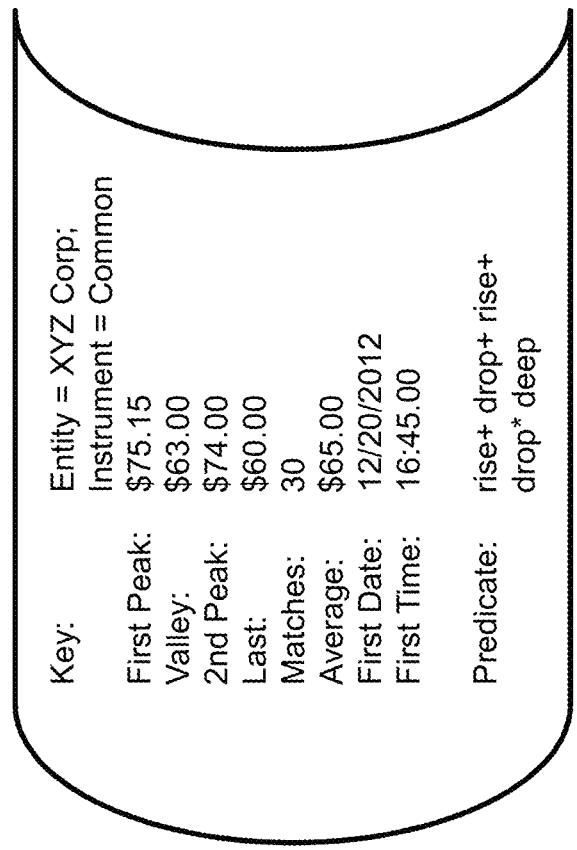

Turning now to FIG. 7c, an example partition map entry 740 according to embodiments of the invention is shown. Referring additionally to FIGS. 4a, 4b and 6, as illustrated, a partition map entry 740 in showing satisfaction of the desired pattern 502 (FIG. 5) is shown. Specifically, aggregate values for first peak, valley and second peak have values, indicating a state in automaton 600 in which at least states S1-S4 have been satisfied. Further, the aggregate value corresponding to "last" contains a value of "last" has a value of $60.00, which is lower than the aggregate value corresponding to "valley" of $63.00. This indicates that the "deep drop" predicate has been satisfied and the state in automaton 600 of state S6 has been met, satisfying all of the predicates and completing all of the states S1-S6 necessary for the satisfaction of desired pattern 502 (FIG. 5). Note that the aggregate values corresponding to "matches" and "average" have been maintained throughout and now reflect aggregate values that represent the entirety of the matching dataset.

In any event, once the determination has been made that the desired pattern 502 (FIG. 5) has been satisfied, an indication that desired pattern 502 (FIG. 5) has been satisfied can be forwarded, such as by matching operator 404. This forwarding of the determination can be to a downstream operator 406 that can be specifically adapted to process pattern results. In addition to the indication, one or more aggregate values can be forwarded. For example, in the case of the data in graph 500, aggregate values such as the first peak 512, the valley 514, the second peak 516, and/or the like can be forwarded. Additionally or in the alternative, computed aggregate information including, but not limited to counts, summations, averages, and/or the like can also be forwarded to the downstream operator 406 along with the indication. In the case of multiple matching operators 404a-n, one or of the matching operators 404a-n can forward the indication, with or without aggregate information, through a merger to a single downstream operator 406.

Figure 8:
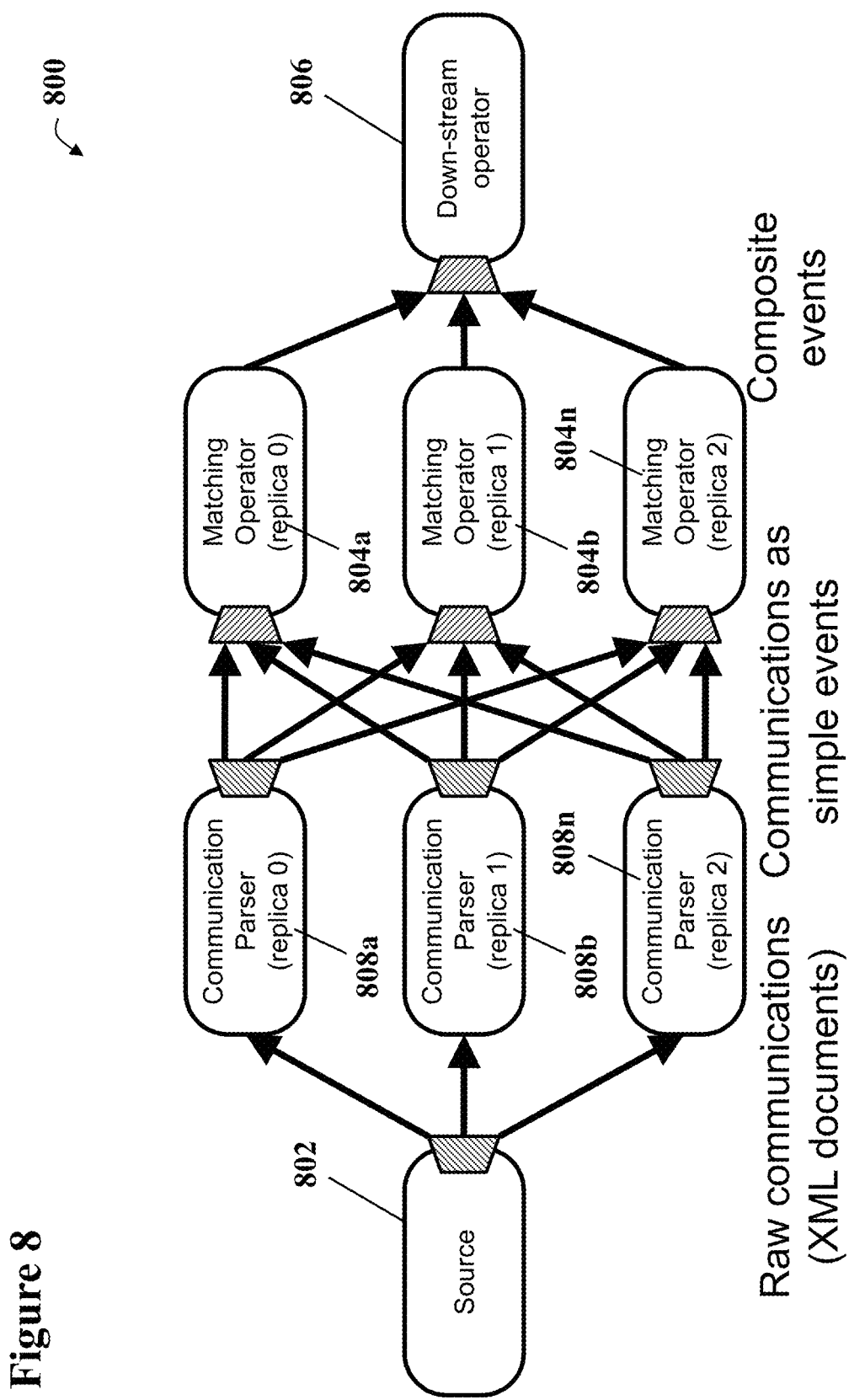
FIG. 8 shows an example data flow according to embodiments of the invention.

Turning now to FIG. 8, an example data flow 800 according embodiments of the invention is shown. As illustrated, similar to data flow 420, data flow 800, includes a source 802, which processes a data stream 300, a number of matching operators 804a-n and a downstream operator 806. However, in contrast to data flow 420, data flow 800 includes an additional set of communication parsers 808a-n. Communication parsers 808a-n provide an additional layer of processing between source 802 and matching operators 804a-n. This can allow data flow 800 to process more complex data such as the communications data (e.g., emails, electronic texts, tweets, social media interactions, and/or the like). To do so, communication parsers 808a-n can receive raw data, such as the raw communications data in data flow 800 and convert the raw data into simple events, which can be distributed to the appropriate matching operators 804a-n corresponding to key values, as discussed elsewhere herein. Matching operators 804a-n can then proceed to match the desired pattern(s) 154 as described elsewhere and forward the composite event results to downstream operator 806.

Figure 9:
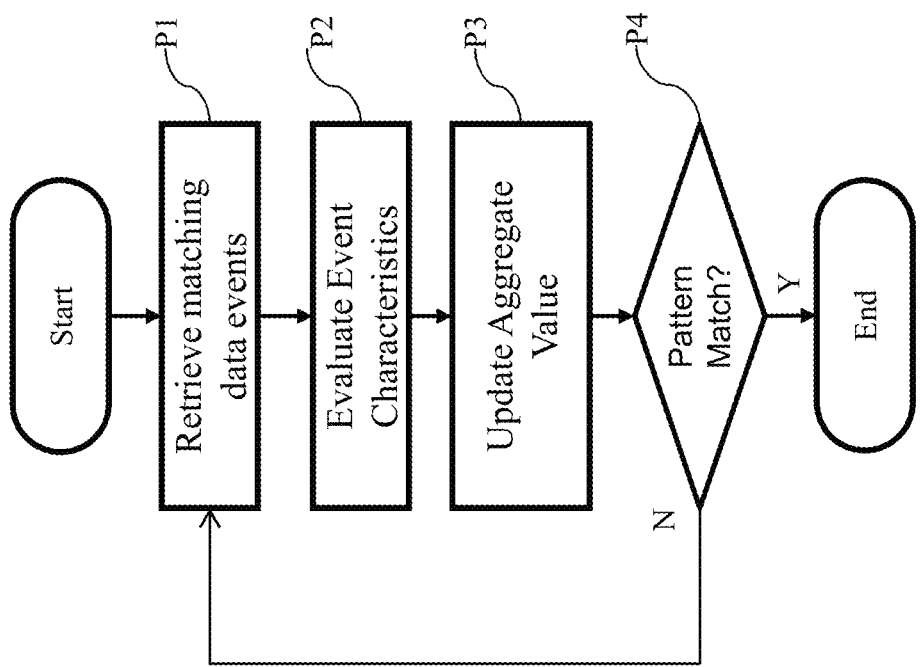
FIG. 9 shows an example flow diagram according to embodiments of the invention.

Turning now to FIG. 9, an example flow diagram according to embodiments of the invention is shown. As illustrated in FIGS. 4a-b in conjunction with FIG. 1, in P1, data event retrieval module 142, as executed by computer system 102, retrieves a set of data events 212 from a data stream. Each of the data events 212 in the data stream 300 has a characteristic that matches a predetermined requested characteristic, which may be represented in a key 412. In P2, data object evaluator module 144, as executed by computer system 102, evaluates one or more characteristic of the received data events 212. The evaluation of characteristic(s) can be performed with respect to one or more aggregate values 156 that correspond to a desired pattern 154. In P3, aggregate value update module 146, as executed by computer system 102, incrementally updates the one or more aggregate values related to the characteristic(s). This incremental update can be performed each time a matching event is received and be based only on the data in that matching event. Further, data, other than aggregate data, from the matching event in not generally retained. In P4, pattern match determining module 148, as executed by computer system 102, determine whether the received set of matching events satisfies the desired pattern 154. This determination can be performed based on the evaluation of the characteristic(s) with respect to the aggregate value 156 and/or the desired pattern 154.

While shown and described herein as a method and system for recognizing a pattern, it is understood that aspects of the invention further provide various alternative embodiments. For example, in one embodiment, the invention provides a computer program fixed in at least one computer-readable medium, which when executed, enables a computer system to recognize a pattern. To this extent, the computer-readable medium includes program code, such as pattern recognition program 140 (FIG. 1), which implements some or all of a process described herein. It is understood that the term "computer-readable medium" comprises one or more of any type of tangible medium of expression, now known or later developed, from which a copy of the program code can be perceived, reproduced, or otherwise communicated by a computing device. For example, the computer-readable medium can comprise: one or more portable storage articles of manufacture; one or more memory/storage components of a computing device; and/or the like.

In another embodiment, the invention provides a method of providing a copy of program code, such as pattern recognition program 140 (FIG. 1), which implements some or all of a process described herein. In this case, a computer system can process a copy of program code that implements some or all of a process described herein to generate and transmit, for reception at a second, distinct location, a set of data signals that has one or more of its characteristics set and/or changed in such a manner as to encode a copy of the program code in the set of data signals. Similarly, an embodiment of the invention provides a method of acquiring a copy of program code that implements some or all of a process described herein, which includes a computer system receiving the set of data signals described herein, and translating the set of data signals into a copy of the computer program fixed in at least one computer-readable medium. In either case, the set of data signals can be transmitted/received using any type of communications link.

In still another embodiment, the invention provides a method of generating a system for recognizing a pattern. In this case, a computer system, such as computer system 120 (FIG. 1), can be obtained (e.g., created, maintained, made available, etc.) and one or more components for performing a process described herein can be obtained (e.g., created, purchased, used, modified, etc.) and deployed to the computer system. To this extent, the deployment can comprise one or more of: (1) installing program code on a computing device; (2) adding one or more computing and/or I/O devices to the computer system; (3) incorporating and/or modifying the computer system to enable it to perform a process described herein; and/or the like.

The terms "first," "second," and the like, if and where used herein do not denote any order, quantity, or importance, but rather are used to distinguish one element from another, and the terms "a" and "an" herein do not denote a limitation of quantity, but rather denote the presence of at least one of the referenced item. The modifier "approximately", where used in connection with a quantity is inclusive of the stated value and has the meaning dictated by the context, (e.g., includes the degree of error associated with measurement of the particular quantity). The suffix "(s)" as used herein is intended to include both the singular and the plural of the term that it modifies, thereby including one or more of that term (e.g., the metal(s) includes one or more metals).

The foregoing description of various aspects of the invention has been presented for purposes of illustration and description. It is not intended to be exhaustive or to limit the invention to the precise form disclosed, and obviously, many modifications and variations are possible. Such modifications and variations that may be apparent to an individual in the art are included within the scope of the invention as defined by the accompanying claims.

What is claimed is:

1. A method for recognizing a pattern, comprising:
   retrieving a set of data events in a data stream, each data event in the data stream having a plurality of characteristics;
   retrieving, by an upstream operator, the set of data events;
   forwarding, by the upstream operator, the set of data events to a matching operator via the data stream;
   gathering, by an event stream splitter, the data stream from the upstream operator;
   hashing the data events in the data stream at the event stream splitter;
   forwarding, by the event stream splitter, the set of data events corresponding to the desired characteristic to the matching operator;
   forwarding, by the event stream splitter, a second set of data events corresponding a second desired characteristic to a second matching operator that evaluates only data events having the second desired characteristic;
   evaluating, at the matching operator, a characteristic of each data event, which has a characteristic that matches a predetermined requested characteristic, in the set of data events with respect to an aggregate value corresponding to a desired pattern and a second desired pattern for the second desired characteristic;
   incrementally updating the aggregate value related to the characteristic using the characteristic of a single data event;
   incrementally updating a second aggregate value related to a second characteristic using the second characteristic of the single data event; and
   determining, based on the evaluation, whether the set of data events received subsequent to a first data event satisfies the desired pattern and the second desired pattern.

2. The method of claim 1, further comprising:
   receiving an input of a key value; and
   allocating the data event for evaluation according to the desired pattern based on the key value,
   wherein the key value includes a characteristic identifier.

3. The method of claim 1, wherein the desired pattern is defined using a set of predicates, each predicate in the set of predicates defining a relationship between the subsequent data event and the at least one of the first data event or the data event received immediately previous.

4. The method of claim 1, wherein the desired pattern includes a regular expression.

5. The method of claim 1, further comprising:
   forwarding, based on a determination that the desired pattern has been satisfied, an indication that the desired pattern has been satisfied from the matching operator to a downstream operator.

6. The method of claim 5, further comprising:
   forwarding the second aggregate value with the indication.

7. A system for recognizing a pattern, comprising at least one computer device that performs a method, comprising:
   retrieving a set of data events in a data stream, each data event in the data stream having a plurality of characteristics;
   retrieving, by an upstream operator, the set of data events;
   forwarding, by the upstream operator, the set of data events to a matching operator via the data stream;
   gathering, by an event stream splitter, the data stream from the upstream operator;
   hashing the data events in the data stream at the event stream splitter;
   forwarding, by the event stream splitter, the set of data events corresponding to the desired characteristic to the matching operator;
   forwarding, by the event stream splitter, a second set of data events corresponding a second desired characteristic to a second matching operator that evaluates only data events having the second desired characteristic;
   evaluating, at the matching operator, a characteristic of each data event, which has a characteristic that matches a predetermined requested characteristic, in the set of data events with respect to an aggregate value corresponding to a desired pattern and a second desired pattern for the second desired characteristic;
   incrementally updating the aggregate value related to the characteristic using the characteristic of a single data event;
   incrementally updating a second aggregate value related to a second characteristic using the second characteristic of the single data event; and
   determining, based on the evaluation, whether the set of data events received subsequent to a first data event satisfies the desired pattern and the second desired pattern.

8. The system of claim 7, the method further comprising:
   receiving an input of a key value; and
   allocating the data event for evaluation according to the desired pattern based on the key value,
   wherein the key value includes a characteristic identifier.

9. The system of claim 7, wherein the desired pattern is defined using a set of predicates, each predicate in the set of predicates defining a relationship between the subsequent data event and the at least one of the first data event or the data event received immediately previous.

10. The system of claim 7, wherein the desired pattern includes a regular expression.

11. The system of claim 7, further comprising an automaton on an upstream operator that performs a method, comprising:
    forwarding, based on a determination that the desired pattern has been satisfied, an indication that the desired pattern has been satisfied from the matching operator to a downstream operator.

12. The system of claim 11, the method further comprising:
    forwarding the second aggregate value with the indication.

13. A non-transitory computer readable storage medium having a program product stored thereon for recognizing a pattern, which, when executed by a computer device, performs a method, comprising:
- retrieving a set of data events in a data stream, each data event in the data stream having a plurality of characteristics;
- retrieving, by an upstream operator, the set of data events;
- forwarding, by the upstream operator, the set of data events to a matching operator via the data stream;
- gathering, by an event stream splitter, the data stream from the upstream operator;
- hashing the data events in the data stream at the event stream splitter;
- forwarding, by the event stream splitter, the set of data events corresponding to the desired characteristic to the matching operator;
- forwarding, by the event stream splitter, a second set of data events corresponding a second desired characteristic to a second matching operator that evaluates only data events having the second desired characteristic;
- evaluating, at the matching operator, a characteristic of each data event, which has a characteristic that matches a predetermined requested characteristic, in the set of data events with respect to an aggregate value corresponding to a desired pattern and a second desired pattern for the second desired characteristic;
- incrementally updating the aggregate value related to the characteristic using the characteristic of a single data event;
- incrementally updating a second aggregate value related to a second characteristic using the second characteristic of the single data event; and
- determining, based on the evaluation, whether the set of data events received subsequent to a first data event satisfies the desired pattern and the second desired pattern.

14. The non-transitory computer readable storage medium having a program product stored thereon of claim 13, the method further comprising:
- receiving an input of a key value; and
- allocating the data event for evaluation according to the desired pattern based on the key value,
- wherein the key value includes a characteristic identifier.

15. The non-transitory computer readable storage medium having a program product stored thereon of claim 13, wherein the desired pattern is defined using a set of predicates, each predicate in the set of predicates defining a relationship between the subsequent data event and the at least one of the first data event or the data event received immediately previous.

16. The non-transitory computer readable storage medium having a program product stored thereon of claim 13, wherein the pattern includes a regular expression.

17. The non-transitory computer readable storage medium having a program product stored thereon of claim 13, the analyzing further comprising:
- forwarding, based on a determination that the desired pattern has been satisfied, an indication that the desired pattern has been satisfied from the matching operator to a downstream operator.

18. The non-transitory computer readable storage medium having a program product stored thereon of claim 17, the method further comprising:
- forwarding the second aggregate value with the indication.

19. A method for deploying an application for recognizing a pattern, comprising:
- providing a computer infrastructure being configured to:
  - retrieve a set of data events in a data stream, each data event in the data stream having a plurality of characteristics;
  - retrieve, by an upstream operator, the set of data events;
  - forward, by the upstream operator, the set of data events to a matching operator via the data stream;
  - gather, by an event stream splitter, the data stream from the upstream operator;
  - hash the data events in the data stream at the event stream splitter;
  - forward, by the event stream splitter, the set of data events corresponding to the desired characteristic to the matching operator;
  - forward, by the event stream splitter, a second set of data events corresponding a second desired characteristic to a second matching operator that evaluates only data events having the second desired characteristic;
  - evaluate, at the matching operator, a characteristic of each data event, which has a characteristic that matches a predetermined requested characteristic, in the set of data events with respect to an aggregate value corresponding to a desired pattern and a second desired pattern for the second desired characteristic;
  - incrementally update the aggregate value related to the characteristic using the characteristic of a single data event;
  - incrementally update a second aggregate value related to a second characteristic using the second characteristic of the single data event; and
  - determine, based on the evaluation, whether the set of data events received subsequent to a first data event satisfies the desired pattern and the second desired pattern.

* * * * *